United States Patent
Kersten et al.

(10) Patent No.: US 7,788,633 B2
(45) Date of Patent: Aug. 31, 2010

(54) BANK NOTE PROCESSING MACHINE AND METHOD FOR OPERATING BANK NOTE PROCESSING MACHINE

(75) Inventors: Guido Kersten, Gröbenzell (DE); Hans Wilhelm Buntscheck, Wolfratshausen (DE)

(73) Assignee: Giesecke & Devrient GmbH, Munich (DE)

( * ) Notice: Subject to any disclaimer, the term of this patent is extended or adjusted under 35 U.S.C. 154(b) by 2388 days.

(21) Appl. No.: 09/917,947

(22) Filed: Jul. 31, 2001

(65) Prior Publication Data

US 2002/0026422 A1    Feb. 28, 2002

(30) Foreign Application Priority Data

Jul. 31, 2000    (DE) .................. 100 37 177

(51) Int. Cl.
    G06F 9/44    (2006.01)
    G06F 12/00   (2006.01)
    G06K 9/00    (2006.01)
    G06K 9/54    (2006.01)

(52) U.S. Cl. .............. 717/102; 717/101; 717/103; 711/1; 711/2; 711/5; 711/100; 711/103; 382/135; 382/305

(58) Field of Classification Search ......... 717/168–175; 382/325, 135–140; 453/1–2, 63; 711/1–6, 711/100–116
    See application file for complete search history.

(56) References Cited

U.S. PATENT DOCUMENTS

| | | | | |
|---|---|---|---|---|
| 5,467,405 A | * | 11/1995 | Raterman et al. | 382/135 |
| 5,680,721 A | * | 10/1997 | Hine, Jr. | 40/611.03 |
| 5,759,102 A |   | 6/1998  | Pease et al. | |
| 5,909,502 A | * | 6/1999  | Mazur | 382/135 |
| 5,940,623 A | * | 8/1999  | Watts et al. | 717/173 |
| 6,039,645 A | * | 3/2000  | Mazur | 453/10 |
| 6,070,012 A | * | 5/2000  | Eitner et al. | 717/168 |
| 6,148,347 A | * | 11/2000 | Finch et al. | 710/14 |
| 6,241,069 B1 | * | 6/2001 | Mazur et al. | 194/207 |
| 6,621,919 B2 | * | 9/2003 | Mennie et al. | 382/135 |
| 6,766,056 B1 | * | 7/2004 | Huang et al. | 382/190 |

(Continued)

FOREIGN PATENT DOCUMENTS

| DE | 43 12 894  | 10/1994 |
|---|---|---|
| DE | 195 34 528 | 3/1997  |

(Continued)

OTHER PUBLICATIONS

Chroust, "Review: Iomega Click! Drive," Apr. 1999.*

(Continued)

*Primary Examiner*—Insun Kang
(74) *Attorney, Agent, or Firm*—Bacon & Thomas, PLLC

(57) ABSTRACT

A bank note processing machine includes a plurality of sensors, a transport system, an input/output device, a control device and an interface. The control device has a memory configured to control elements of the bank note processing machine by means of software and/or data stored in the memory. The interface is arranged to couple memory systems of different kinds to the bank note processing machine in order to alter, supplement or replace software and/or data stored in the memory.

5 Claims, 1 Drawing Sheet

U.S. PATENT DOCUMENTS

2001/0006556 A1 * 7/2001 Graves et al. ............... 382/135
2001/0043432 A1 * 11/2001 Hamatsu et al. .......... 360/99.02
2006/0210137 A1 * 9/2006 Raterman et al. ........... 382/135

FOREIGN PATENT DOCUMENTS

EP 0 854 456 7/1998
EP 0 987 627 9/1998

OTHER PUBLICATIONS

Fokes, Don: 8-Bit-Mikrocontroller erlaubt Softwareanderungen uber serielle Schnittstelle. In: Design & Elektronik, Apr. 4, 1989, S. 98, 100, 102, S. 104.

Rankl, Wolfgang, Effing, Wolfgang: Handbuch der Chipkarten, Carl Hanser Verlag, Munchen, Wien, 2. Aufl., 1996, S. 28-35.

* cited by examiner

BANK NOTE PROCESSING MACHINE AND METHOD FOR OPERATING BANK NOTE PROCESSING MACHINE

BACKGROUND

This invention relates to a bank note processing machine and a method for operating said bank note machine.

Bank note processing machines usually have microprocessors or similar program-controlled parts today. Software is required to a considerable extent for operation, i.e. for program control. The software controls all elements of the bank note machine as well as its functions such as transport system, sensor system, etc. In addition, all parameters and data of the bank notes to be processed are stored in the form of software, in particular characteristic features of the bank notes which are evaluated by means of the sensor system e.g. for checking authenticity.

In order to keep the software used in the bank note processing machine up to date, different procedures have become known.

For example, in a known procedure it is provided that the software is stored in memory chips such as EPROMs (electrically programmable read only memory) or EEPROMs (electrically erasable and programmable read only memory) and the thus prepared memory chips distributed to the users of the bank note processing machines. The users replace the memory chips originally present in the bank note processing machines by the thus prepared memory chips, thereby making the new software available.

In another known form of realization, it is provided that a storage medium in the form of a flash card is used. Flash cards have the advantage over the above-described memory chips of being very easy to handle. The flash card need only be plugged into a specially provided plug strip of the bank note processing machine to make the new software stored in the flash card available to the bank note processing machine.

A bank note processing machine with the possibility of using new software by means of flash card is known for example from U.S. Pat. No. 5,909,502. The stated document proposes two different embodiments. In the first embodiment it is provided that the new software stored in the flash card is transferred to a memory of the bank note processing machine and stored lastingly therein. The flash card can then be removed from the bank note processing machine. In a second embodiment it is provided that the bank note processing machine is operated by means of the software stored in the flash card as long as the flash card is connected with the bank note processing machine. After removal of the flash card the bank note processing machine is operated with the software originally stored in the memory of the bank note processing machine.

However, known bank note processing machines show the disadvantage that they are inflexible with respect to the storage medium available for updating the software since the use of a certain storage medium is required. It is thus not possible to adapt the storage medium used to the particular needs at hand.

SUMMARY

The problem of the present invention is therefore to state a bank note processing machine and method for operating said bank note processing machine by which any memory systems are available for updating, altering or replacing software so as to permit the use of a memory system especially suitable for the particular case of application.

The basic idea is to provide an interface for the bank note processing machine which allows a plurality of different memory systems to be coupled.

The use of an interface thus makes it possible to select from a plurality of memory systems the one most suitable for the application. Criteria for selecting the most suitable memory system may be memory volume, size, robustness, price, etc.

In an advantageous embodiment the interface provided is a standardized interface, in particular a PCMCIA interface. Such standardized interfaces show the advantage that a plurality of memory systems are already available on the market which can immediately be used without any further adaptation for updating, replacing or altering the software of the bank note processing machine.

In another advantageous embodiment, the memory system has a magnetic or optical storage medium, in particular with a magnetic or optical recording medium having high writing density. This makes it possible to fall back on inexpensive recording media suitable for recording masses of data. When the software is to be altered, a recording medium on which the new software is stored need thus only be made available. The recording medium originally used can also be reused for this purpose. One need merely store the new software on the original recording medium.

Further advantages of the invention can be found in the dependent claims and the following description of examples with reference to figures, in which:

DETAILED DESCRIPTION OF VARIOUS EMBODIMENTS

The figures show only the elements of bank note processing machines which are relevant in connection with the present invention. Elements of the same kind that are shown in different figures have the same reference signs.

Figure 1:
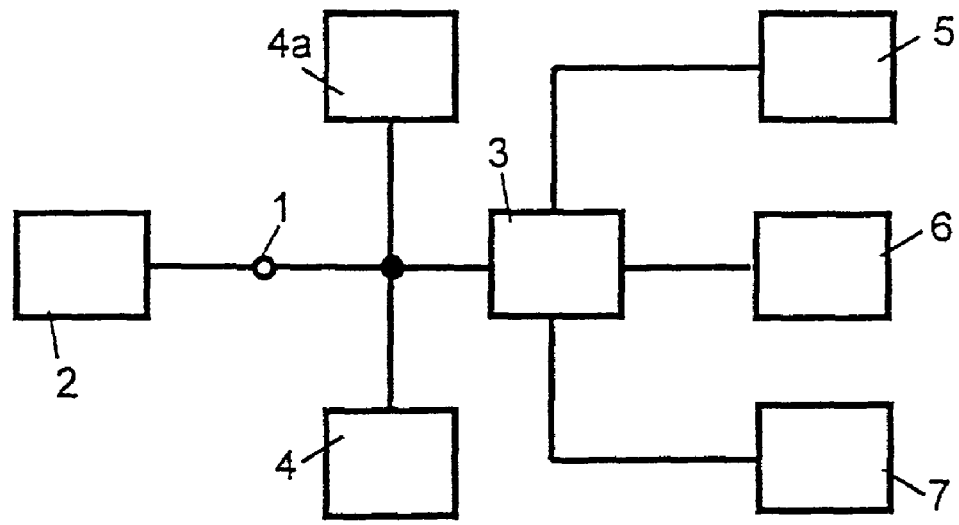
FIG. 1 shows an example of a bank note processing machine with an interface for coupling memory systems.

FIG. 1 shows an example of a bank note processing machine with interface 1 for coupling memory system 2. The bank note processing machine has in addition control device 3, for example a microprocessor, with associated memory 4, 4a. Controller 3 evaluates the signals of all elements of the bank note processing machine, such as from sensors 5, transport system 6 and input/output device 7, and controls all elements of the bank note processing machine.

For controlling the bank note processing machine, memory 4, 4a has nonvolatile memory 4 in which software is stored. Nonvolatile memory 4 is for example an EEPROM, flash or hard-disk memory. For execution of the software by controller 3, memory 4, 4a has volatile memory 4a, for example a RAM. The software stored in nonvolatile memory 4 contains for example elements for operating the bank note processing machine, elements for assessing and evaluating the data detected by sensors 5, such as characteristic features of the bank notes being processed, and elements for execution control, in particular for controlling transport system 6 and input/output device 7. In addition one can store in memory 4, 4a data which are obtained during the processing of bank notes, for example the total value of processed bank notes, the number of certain denominations of processed bank notes, the association of processed bank notes with certain currencies, etc.

Transport system 6 consists for example of a unit for singling bank notes, a transport unit which transports the single bank notes along sensors 5 to supply them to one or more stacking units in accordance with the evaluation of the data of sensors 5 by controller 3.

Input/output device 7 includes a keyboard and a display and/or a printer to permit a user to operate the bank note processing machine.

Interface 1 for coupling memory system 2 is generally a bus for exchanging data between memory system 2 and memory 4, 4a or controller 3 of the bank note processing machine. Interface 1 is monitored by controller 3 for the presence of memory system 2. If memory system 2 is coupled to the interface, the data or software stored in memory system 2 can be read out under the control of controller 3. Interface 1 can have any design, being constructed for example in contacting fashion or in contactless fashion, e.g. by means of an infrared link. It is especially advantageous to use an interface according to the PCMCIA standard since a plurality of memory systems are available for such interfaces and can be used without further adaptation.

For further processing of the software or data from memory system 2 it is possible to load the data or software directly into volatile memory 4a in order to execute the software stored in memory system 2. In this case the data or software stored in nonvolatile memory 4 remains unchanged after separation of memory system 2 from interface 1.

It is likewise possible to transfer the data or software stored in memory system 2 into nonvolatile memory 4 under the control of controller 3 and store it where the previous data or software is overwritten. After separation of the memory system from interface 1 the data or software stored in memory system 2 is then available in the bank note processing machine.

Alternatively, it can be provided that not all of the data or software in nonvolatile memory 4 is replaced by data or software stored in memory system 2. In this case only certain elements of the data or software of nonvolatile memory 4 are replaced by data or software of memory system 2. For example one can replace only the software or parts thereof required for operating or controlling the transport system. It is likewise possible to alter or replace only the characteristic data of certain bank notes to be processed.

Figure 2:
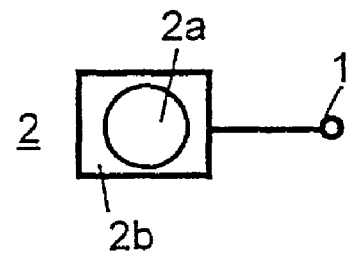
FIG. 2 shows an example of a memory system according to FIG. 1.

FIG. 2 shows an embodiment of memory system 2 shown in FIG. 1. Memory system 2 consists of drive 2b that can be coupled to the bank note processing machine via interface 1, and associated storage medium 2a. A particular suitable memory system 2 is e.g. one for optical and/or magnetic recording, for example the memory system sold by Iomega under the name of Click Drive that consists of a drive and magnetic storage media. In this case it is possible to update the data or software at low expenditure since inexpensive storage media 2a need only be newly created and elaborate drive 2b can be reused. To further lower the expenditure, one can also reuse storage media 2a if they are rewritable. Memory system 2 can also be disposed at a place remote from the bank note processing machine. Memory system 2 is then coupled with interface 1 via a data link. As a data link one can use a commonly known wire-bound one (e.g. LAN, Internet) or a wireless one (e.g. GSM).

The use of specially prepared memory systems 2 or storage media 2a makes it possible to realize special operating modes in simple fashion without having to alter the original setting or operating mode.

A special operating mode may be a mode for testing the bank note processing machine. The complete software for performing the test mode is stored in this case in memory system 2 or storage medium 2a, all necessary defaults and data and parameter settings required for the test mode also being stored. After coupling of memory system 2 to interface 1, or after insertion of storage medium 2a into drive 2b, the testing of the bank note processing machine is performed automatically. Data obtained during the test and providing information about the condition of the bank note processing machine can be stored for later evaluation in memory system 2 or storage medium 2a. After uncoupling of memory system 2 or removal of storage medium 2a, the bank note processing machine continues working in the mode that was set before testing and is stored in nonvolatile memory 4.

For test purposes it may also be provided that data obtained during the processing of bank notes in the bank note processing machine are stored in memory system 2 or storage medium 2a in order for them to be accessible for a later check. For example, the data of sensors 5 can be stored. For this purpose, sample bank notes are processed in the bank note processing machine, for example, and the data thereby obtained from sensors 5 stored in memory system 2 or storage medium 2. The data stored in memory system 2 or storage medium 2a can then be evaluated at any place by a service organization in order to check the correct working of the sensors. If deviations are determined, it is possible for the service organization to create parameters for the setting of sensors 5 and store them in memory system 2 or storage medium 2a which is coupled to the bank note processing machine again in order to transfer into nonvolatile memory 4 the altered parameters for the setting of sensors 5 performed by the service organization. The advantage of the described procedure is that the bank note processing machine can be serviced without a need for service personnel on site. Another advantage is that normal operation of the bank note processing machine can be continued except for a short interruption, since no elaborate settings for the test mode are required.

Another operating mode may be a user-specific mode. Certain defaults for a user are set and stored in memory system 2 or storage medium 2a. Such defaults may for example define a sorting process or the processing of certain denominations or currencies. For this purpose either the entire software with all settings, parameters, data, etc., is stored in memory system 2 or storage medium 2a, or only the required settings, parameters, data, etc., are stored. In the first case, after the coupling of memory system 2 or the insertion of storage medium 2a into the drive the control of the bank note processing machine by control device 3 takes place completely by means of the software, settings, parameters, data, etc., as stored in memory system 2 or storage medium 2a. In the second case the software stored in nonvolatile memory 4 is used and the settings, parameters, data, etc., required for the mode are read out from memory system 2 under the control of control device 3 in order to put the bank note processing machine in the desired mode.

During operation of the bank note processing machine in a mode given by means of memory system 2 or storage medium 2a, e.g. for a certain user, all data obtained during processing of bank notes can be stored in memory system 2 or storage medium 2a for later evaluation. For example, statements about the total number of processed bank notes, the number of bank notes of a certain denomination, the currency, etc., can be stored. Further information about the processed bank notes, e.g. authenticity, condition, etc., can likewise be stored. The data from processing can also be stored separately for partial amounts of the processed bank notes, for example in the form of so-called deposits; i.e. certain amounts of bank notes coming from certain customers are assigned to this certain customer and stored accordingly.

Memory system 2 or storage medium 2a can also be used only for storing the entire accounting data. For operation of the bank note processing machine one uses in this case the software, data, etc., stored in nonvolatile memory 4.

Furthermore, a plurality of memory systems 2 or storage media 2a can be used for storing the accounting data of individual customers or deposits. They can be transported and processed together with the bank notes for further processing of the latter. One memory system 2 or storage medium 2a is used per customer or deposit in this case.

It can likewise be provided that the software and/or data are stored in memory system 2 or storage medium 2a in encoded form. The encoded software and/or data are then transferred to the bank note processing machine via interface 1, as described above. The encoded software and/or data might then be stored in nonvolatile memory 4, 4a in encoded form and decoded by control device 3 for operation. Corresponding decoding software is stored in nonvolatile memory 4 for this purpose.

It is likewise possible for the encoded software and/or data to be decoded by control device 3 as soon as they have been transferred via interface 1. The decoded software and/or data are then stored in nonvolatile memory 4, 4a.

The invention claimed is:

1. A bank note processing machine comprising:
   sensors, a transport system including a singling unit and at least one stacking unit, an input/output device;
   a control device with an associated memory which controls the elements of the bank note processing machine by means of software and/or data stored in the memory; and
   an interface which makes it possible to couple memory systems of different kinds to the bank note processing machine in order to alter, supplement or replace the software and/or data stored in the memory;
   wherein the memory system has a drive and a storage medium which are suitable for optical and/or magnetic recording;
   wherein the transport system transports single bank notes singled by the singling unit along the sensors to the at least one stacking unit according to an evaluation of data obtained by the sensors by the control device; and
   wherein data obtained in the bank note processing machine during operation are stored in the memory system.

2. The bank note processing machine according to claim 1, wherein that the interface is a standardized interface, in particular according to PCMCIA.

3. The bank note processing machine according to claim 1, wherein the memory has a nonvolatile area, and after coupling of the memory system to the interface the software and/or data stored in the memory system are stored in the nonvolatile area.

4. The bank note processing machine according claim 1, wherein that the memory has a volatile area, and after coupling of the memory system to the interface the software and/or data stored in the memory system are stored in the volatile area.

5. The bank note processing machine according to claim 1, wherein the software and/or data stored in the memory system are stored in encoded form, and the controller is set up to decode the encoded software and/or data.

\* \* \* \* \*